US006759071B2

(12) United States Patent
Nye et al.

(10) Patent No.: US 6,759,071 B2
(45) Date of Patent: Jul. 6, 2004

(54) METHOD FOR MANUFACTURE OF CONTAINER FOR STORAGE AND SERVING OF BREASTMILK

(76) Inventors: Rebecca R. Nye, 3780 Vancouver Dr., Dallas, TX (US) 75229; Daniel J. Nye, 3780 Vancouver Dr., Dallas, TX (US) 75229

( * ) Notice: Subject to any disclaimer, the term of this patent is extended or adjusted under 35 U.S.C. 154(b) by 0 days.

(21) Appl. No.: 10/370,810

(22) Filed: Feb. 20, 2003

(65) Prior Publication Data

US 2003/0124232 A1 Jul. 3, 2003

Related U.S. Application Data

(62) Division of application No. 09/496,145, filed on Feb. 1, 2000, now Pat. No. 6,551,639.

(51) Int. Cl.[7] .......................... A23L 3/00; B65B 55/12
(52) U.S. Cl. ........................ 426/394; 426/399; 426/411
(58) Field of Search ................................ 426/394, 399, 426/411

(56) References Cited

U.S. PATENT DOCUMENTS

| | | | | | |
|---|---|---|---|---|---|
| 756,234 | A | * | 4/1904 | Heath | 215/250 |
| 1,184,568 | A | * | 5/1916 | Puhl | 215/250 |
| 1,617,783 | A | * | 2/1927 | Aicher | 215/250 |
| 2,099,370 | A | * | 11/1937 | Monnier | 215/247 |
| 2,200,600 | A | * | 5/1940 | Grapp | 215/247 |
| 2,438,299 | A | * | 3/1948 | Relis | 215/11.1 |
| 3,146,904 | A | * | 9/1964 | Hansen et al. | 215/11.1 |
| 3,266,910 | A | * | 8/1966 | Barnby | 426/117 |
| 3,441,160 | A | * | 4/1969 | Levy | 215/11.1 |
| 3,530,979 | A | * | 9/1970 | Merrill et al. | 206/525 |
| 3,746,198 | A | * | 7/1973 | Howland | 215/11.1 |
| 3,770,154 | A | * | 11/1973 | Johnson | 215/11.5 |
| 3,776,408 | A | * | 12/1973 | Wald | 215/11.3 |
| 3,851,781 | A | * | 12/1974 | Marco | 215/11.3 |
| 3,871,542 | A | * | 3/1975 | Hammer | 215/11.3 |
| 4,412,623 | A | * | 11/1983 | Schmidt | 215/11.1 |
| 4,678,092 | A | * | 7/1987 | Rane | 215/11.3 |
| 4,706,827 | A | * | 11/1987 | Cabernoch et al. | 215/11.3 |

(List continued on next page.)

FOREIGN PATENT DOCUMENTS

| | | | | |
|---|---|---|---|---|
| CH | 559674 | * | 3/1975 | 215/250 |
| FR | 1287487 | * | 1/1961 | 215/11.3 |
| GB | 368553 | * | 3/1932 | 215/250 |
| GB | 695086 | * | 8/1953 | 215/250 |
| WO | W096/14066 | * | 11/1990 | 215/11.3 |

OTHER PUBLICATIONS

Internet document "Playtex—Disposable Bottle System"; Nov. 29, 1999; Platex Corp.; http://www.playtexbaby.com/disposable.htm, 3 pages.

*Primary Examiner*—Steve Weinstein
(74) *Attorney, Agent, or Firm*—Robert H. Frantz

(57) ABSTRACT

A disposable, aseptic package for storage and serving of perishable beverages, such as human breast milk. The package is generally cylindrical in shape, the top of which is provided with a circular flange about the circumference of the package, such that the filled package can be dropped down into a cylindrical outer holder. The package is held with its top surface near the top of a holder by the flange. A dispensing assembly, such as a nipple assembly or straw assembly, is mounted atop the holder. As the dispensing assembly is mounted on the holder, a penetrating conduit engages the top surface of the package and punctures it, thereby providing a via for the beverage to flow freely from the package to the dispensing assembly, such as through a nipple or through a straw.

4 Claims, 6 Drawing Sheets

U.S. PATENT DOCUMENTS 4,796,758 A 1/1989 Hauk
4,858,766 A * 8/1989 Tsai ........................... 229/204
4,869,912 A * 9/1989 McCoy et al. .............. 426/123
4,969,564 A * 11/1990 Cohen et al. .............. 215/11.1
4,982,880 A * 1/1991 Angeloz et al. ............ 222/490
5,052,614 A * 10/1991 Xuan ...................... 229/103.1
5,201,460 A * 4/1993 Caines .................... 229/103.1
5,395,322 A * 3/1995 Moser et al. ................. 604/77
5,639,432 A 6/1997 Carlson
5,664,705 A 9/1997 Stolper
5,704,541 A 1/1998 Mogard
5,873,474 A * 2/1999 Gray ......................... 215/11.1
5,893,477 A 4/1999 Kaneko et al.
5,927,046 A 7/1999 Martin
5,938,107 A 8/1999 Anchor et al.
6,054,099 A * 4/2000 Levy .......................... 422/102

* cited by examiner

METHOD FOR MANUFACTURE OF CONTAINER FOR STORAGE AND SERVING OF BREASTMILK

CROSS-REFERENCE TO RELATED APPLICATIONS (CLAIMING BENEFIT UNDER 35 U.S.C. 120)

This application is a divisional application related U.S. patent Ser. No. 09/496,145, now U.S. Pat. 6,551,639, entitled, "Container for Storage and Serving of Breastmilk, filed on Feb. 1, 2000 by Rebecca R. Nye.

INCORPORATION BY REFERENCE

This applications incorporates by reference the related parent application, U.S. patent Ser. No. 09/496,145, now U.S. Pat. 6,551,639, entitled, "Container for Storage and Serving of Breastmilk", filed on Feb. 1, 2000, by Rebecca R. Nye.

TECHNICAL FIELD OF THE INVENTION

This invention pertains to the art of food containers for perishable beverages, especially human breast milk, baby formula, nutritional supplements, and fruit juices. In particular, this invention relates to aseptic containers in which perishable beverages can be stored at ambient temperature, and from which perishable beverages can be served.

FEDERALLY SPONSORED RESEARCH AND DEVELOPMENT STATEMENT

This invention was not developed in conjunction with any Federally-sponsored contract.

MICROFICHE APPENDIX

Not applicable.

BACKGROUND OF THE INVENTION

The need to store, transport, and serve perishable beverages has been answered in part by several available well-known containers. However, many of these containers are not suitable for storage of human breast milk and baby formula.

One well-known package is the "Brick Pack" by Tetra Laval Holding & Finance, S. A., of Pully, Switzerland. This aseptic package is commonly used for storage and serving of juice products and long-term storage milk. The package includes a coated paperboard outer carton, which is folded into a generally cubical or rectangular shape, and sealed with an internal coated foil liner. The package is sterilized prior to filling with the beverage, and then hermetically sealed. The product can then be stored at ambient temperature, and is served by inserting a pointed straw through an aperture provided in the carton paperboard. The straw punctures the inner foil seal, and allows for the beverage to be consumed via the straw. Some other variants of this package include a re-sealable pouring spout, but after the initial aseptic seal is broken, the remaining product contents must be refrigerated. Tetra Laval holds several U.S. patents to similar packages and related manufacturing methods, including U.S. Pat. No. 5,704,541 to Mogard; U.S. Pat. No. 5,639,432 to Carlson; U.S. Pat. No. 5,893,477 to Kaneko, et al; U.S. Pat. No. 5,927,046 to Martin; and U.S. Pat. No. 5,938,107 to Anchor, et al. However, these packages are not particularly suitable for directly serving perishable beverages such as human breast milk to an infant, as infants are unable to drink from a straw. Alternatively, breast milk stored in such as package with a pouring spout is undesirable in that it requires a care giver to pour the liquid into another container, such as a baby bottle. This requires the care giver to keep on hand and/or travel with one or more clean serving containers, and to prepare the serving in an environment conducive to pouring. This excludes this scheme from use in moving vehicles, windy outdoors, crowded conditions, etc. It also provides an opportunity for the beverage to become contaminated by the unsterilized serving container or from the nearby environment. Finally, when the serving is completely consumed, the serving container generally must be kept for washing later.

Another common serving package for baby formula and breast milk is a bottle and liner system manufactured by Playtex Products, Inc., of Dover, Del. The Playtex bottle consists of a generally cylindrical holder, in which a plastic liner bag is placed and filled with liquid. In one variant, the liner bag top is stretched over the top of the holder. In another variant, the liner bag is provided with a semi-rigid ring around the top to facilitate installation of the bag in just one hand. In either case, a soft plastic nipple and retainer ring are installed over the top of the holder, forming a liquid-tight seal between the liner bag and the nipple. As the beverage is consumed by an infant, the liner bag collapses. This system, however, does not provide for sterile and aseptic storage of the breast milk, and thus requires refrigeration after being filled.

A similar system is described in U.S. Pat. No. 5,424,086 to Walker. In the Walker patent, a disposable plastic bag is disclosed which may be filled and sealed prior to consumption. When the serving is prepared, the contents of the bag are poured into another serving vessel, or the bag is dropped down into another vessel such as a baby bottle, and the top is cut off and stretched over the rim of the bottle. This system shares similar disadvantages as the Playtex system and as the paperboard containers discussed supra.

An alternative packaging solution was described in U.S. Pat. No. 5,664,705 to Stolper. The Stolper package includes a container, a valve arrangement, and a nipple for serving. The package is defined as two reservoirs, a storage portion and a dispensing portion. Pressure on the sides of the storage reservoir forces the beverage through the valve arrangement and into the dispensing reservoir, and the beverage in the dispensing portion may be consumed. Back flow from the dispensing portion into the storage reservoir is prevented, allowing a measured amount of the beverage to be dispensed and keeping the beverage in the storage reservoir from contamination. However, the complexity of this package may prohibit production at very low costs, and the need for pressure to cause distribution of the beverage is a disadvantage.

Therefore, there is a need in the art for an aseptic package and method for manufacture of the package suitable for storage of perishable beverages such as breast milk. Further, there is a need in the art for this package to allow serving directly from the package to minimize the possibility of contamination of the contents, and the maximize the usefulness and convenience of the product. Additionally, there is a need in the art for this package to be realizable in materials which allow it to be disposable and affordable.

SUMMARY OF THE INVENTION

The present invention employs a disposable, aseptic package for storage and serving of perishable beverages, such as human breast milk. The package is generally cylindrical in shape. The top of the package is provided with a circular flange about the circumference of the package, such that the filled package can be dropped down into a cylindrical outer holder. The package is held with its top surface near the top of the holder by the flange. A dispensing assembly, such as a nipple assembly or straw assembly, is then mounted atop the holder. As the dispensing assembly is mounted on the holder, a penetrating conduit engages the top surface of the package and punctures it, thereby providing a via for the beverage to flow freely from the package to the dispensing assembly, such as through a nipple or through a straw.

BRIEF DESCRIPTION OF THE DRAWINGS

The figures presented herein when taken in conjunction with the disclosure form a complete description of the invention.

DETAILED DESCRIPTION OF THE INVENTION

The objects, features and advantages of the invention will be apparent from the following detailed description of a preferred embodiment of the invention, which illustrated in the accompanying drawings in which like reference numbers indicate like parts of the invention.

Figure 1A:
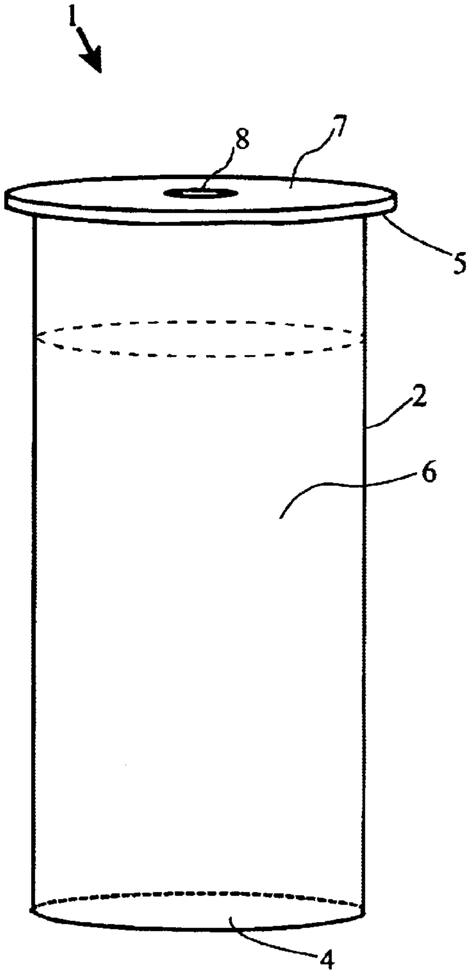
FIG. 1 presents a view of the disposable, aseptic package.
Figure 1B:
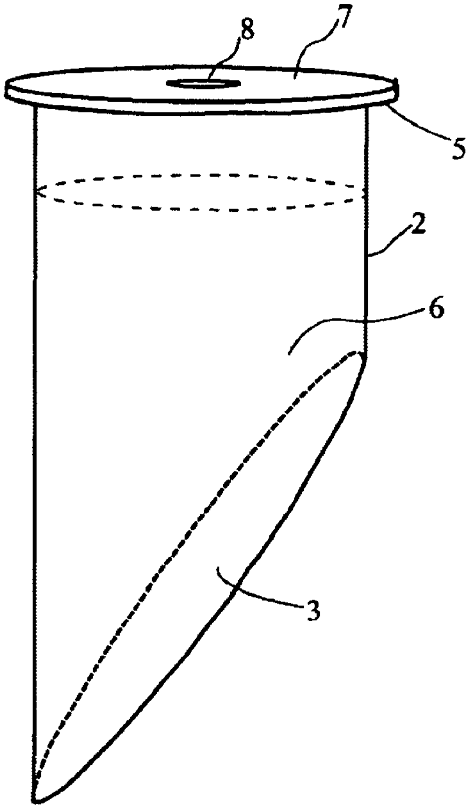

Turning to FIG. 1*a*, an aseptic drop-in package (1), for perishable beverages and other liquids is shown. The drop-in (1) package preferably has a generally cylindrical shape, but it could take a substantially rectangular shape as well without adverse effect on functionality. This container portion (2) of the package is preferably constructed of molded or heat formed semi-rigid plastic using similar materials and methods used to manufacture crushable, disposable plastic cups. An annular flange (5) is formed around the top circumference of the container portion (2) to add reinforcement to the round shape of the container portion, and to provide a mechanical detente when the drop-in package is installed in a bottle or holder. The annular flange is shown wider than necessary in FIGS. 1*a* and 1*b* for illustrative purposes, and must only be of suitable width to hold the filled drop-in package in place as described infra.

The lid portion (7) of the drop-in package is preferably a two-ply design. The first ply is a thin hermetically sealed film which is stretched taut across the top of the container portion (2), and glued or heat sealed to the annular flange (5) so as to form a hermetically sealed reservoir (6) within the drop-in package. The first ply film is preferably constructed of a material which has high tensile strength, but is easily punctured through the thickness of the film. Such materials include mylar film and aluminum foil. The second ply of the lid portion (7) is a thicker material less susceptible to puncture than the first ply, such as 3 or 4 mil plastic or coated paperboard. A circular puncture port (8) is provided in the center of the second ply. The second ply is continuously bonded atop the first ply using glue, heat seal, or any other suitable bonding method. The first ply film is exposed to puncture through the circular puncture port (8), while the remaining area of the first ply film is protected from puncture by the second ply.

Finally in FIG. 1, the container portion (2) may have a generally flat bottom (4), or an angled bottom (3). The flat bottom (4) allows the drop-in package to be placed upright on a level surface, while the angle bottom (3) may promote better flow of the beverage with minimized air gaps when the package is tilted.

Figure 2:
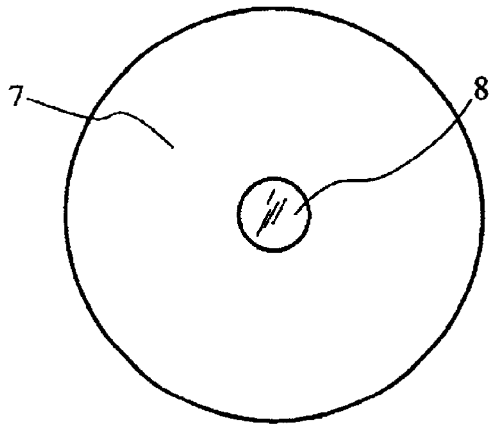
FIG. 2 shows a top view of the disposable, aseptic package.

Turning to FIG. 2, a top view of the lid portion (7) is shown, with the exposed first ply film through the puncture port (8).

Figure 3:
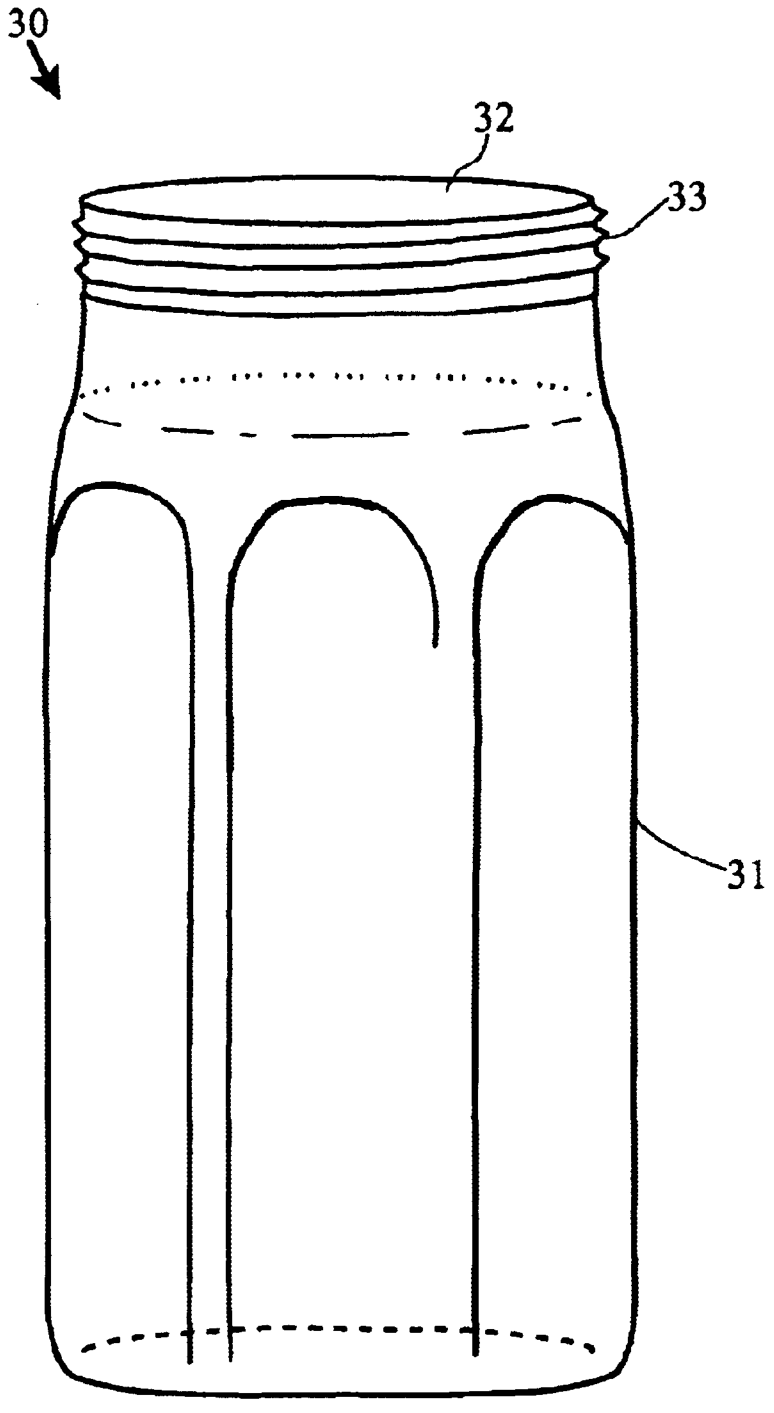
FIG. 3 depicts a typical bottle for baby formula.

FIG. 3 shows a holder (30) for the drop-in package, which is a generally cylindrical open-mouth bottle (31) having a threaded portion (33) around the top of the open-mouth for receiving a dispensing assembly. A cavity (32) for receiving the drop-in package is of sufficient diameter to allow the container portion (2) of the drop-in package to freely move in and out of the holder (30) without mechanical interference, but of small enough diameter to intercept the flange (5) of the drop-in package around the lip of the holder (30) just above the threaded portion (33). This allows the drop-in package (2) to be easily installed in the holder (30), with it coming to rest along the flange and the lip of the holder. Conversely, the diameter of the drop-in package may be set to an appropriate value so as to allow use of a particular prior art baby bottle as the holder.

Figure 4A:
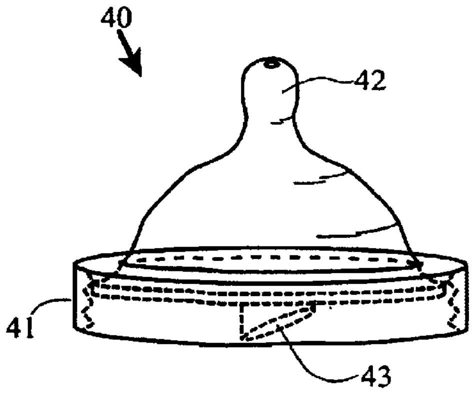
FIG. 4*a* illustrates a nipple-type dispensing assembly, including the puncturing conduit.
Figure 4B:
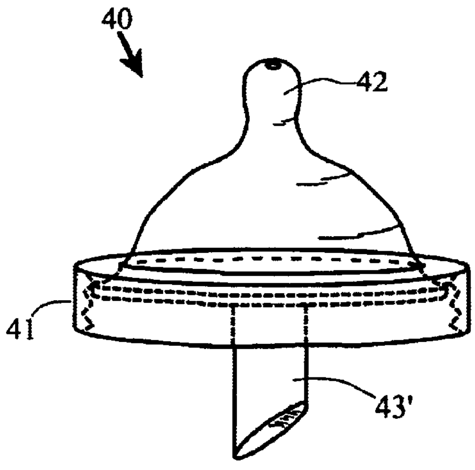
FIG. 4*b* shows an alternate embodiment of the nipple assembly.

FIG. 4*a* shows the preferred embodiment (40) of the dispensing assembly. This embodiment is a nipple-type dispensing assembly for use with serving infants and toddlers. It consists of a threaded plastic ring (41), through which a soft plastic formed nipple (42) is installed. The threads in the plastic ring (41) are mating threads to the threaded portion (33) of the holder. The nipple is provided with one or more orifices through which the liquid beverage may flow when a suction is applied by the nursing infant or toddler. The basic nipple and ring arrangement is well known in the art. Added to the well-known arrangement is a puncturing conduit (43) which punctures the first ply film of the lid portion (7) of the drop-in package through the puncture port (8) when the dispensing assembly is screwed onto the top of the holder. In the preferred embodiment of the nipple assembly, puncturing conduit (43) is shorter than the thread length. This allows the nipple assembly to be placed on the top of the holder, and for the threads to engage prior to the puncturing conduit breaking the package seal. FIG. 4*b* shows an alternate embodiment of the nipple assembly, in which the puncturing conduit (43') is longer than the depth of the threaded ring depth, which allows the user to puncture the seal on the beverage container prior to threading the nipple assembly onto the holder.

Figure 6:
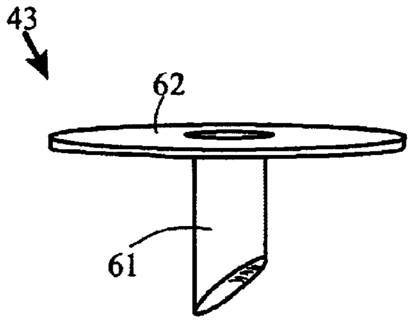
FIG. 6 illustrates the details of the puncturing conduit.

The puncturing conduit (43) is shown in more detail in FIG. 6. The puncturing conduit (43) is preferably a single-piece molded rigid plastic device, having a circular disk (62) with a pointed conduit (61) centered on the disk (62) as shown. The length of the pointed conduit (61) should exceed the diameter of the puncture port (8) so that when a circular flap of the film is pressed through by the conduit, the flap does not extend far enough towards the pointed end of the conduit so as to be drawn back into the conduit by the liquid flow. The diameter of the pointed conduit must be slightly less than the diameter of the puncture port (8) to allow it to pass without interference through the port. The puncturing conduit (43) is installed into the threaded ring (41) following the nipple (42). So, the diameter of the circular disk (62) is preferably set to a value slightly less than the inside diameter of the threads of the threaded ring (41) so as to allow easy installation and removal of the puncturing conduit but to allow a light friction fit to retain the puncturing conduit in the threaded ring.

Figure 5:
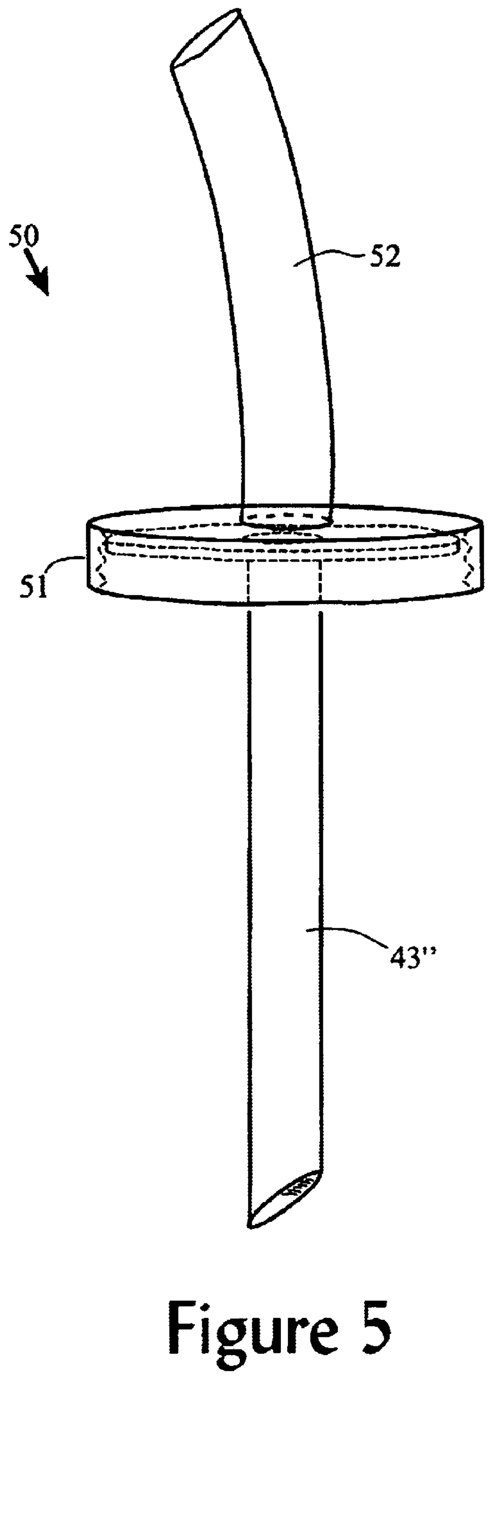
FIG. 5 shows straw-type dispensing assembly.

FIG. 5 shows a straw-type dispensing assembly in which a straw is formed in the assembly rather than a nipple. A single-piece molded plastic device may include a threaded ring (51) and a flexible straw portion (52), or this may be constructed of 2 molded plastic pieces. The puncturing conduit (43") is installed in the threaded ring (51) similarly to the nipple-type dispensing assembly, but is much longer to allow access to fluids in the container when the container is held upright instead of inverted. This straw-type assembly is useful for serving perishable fluids to non-infants, such as nutritional supplements to bedridden patients and elderly persons.

Figure 7:
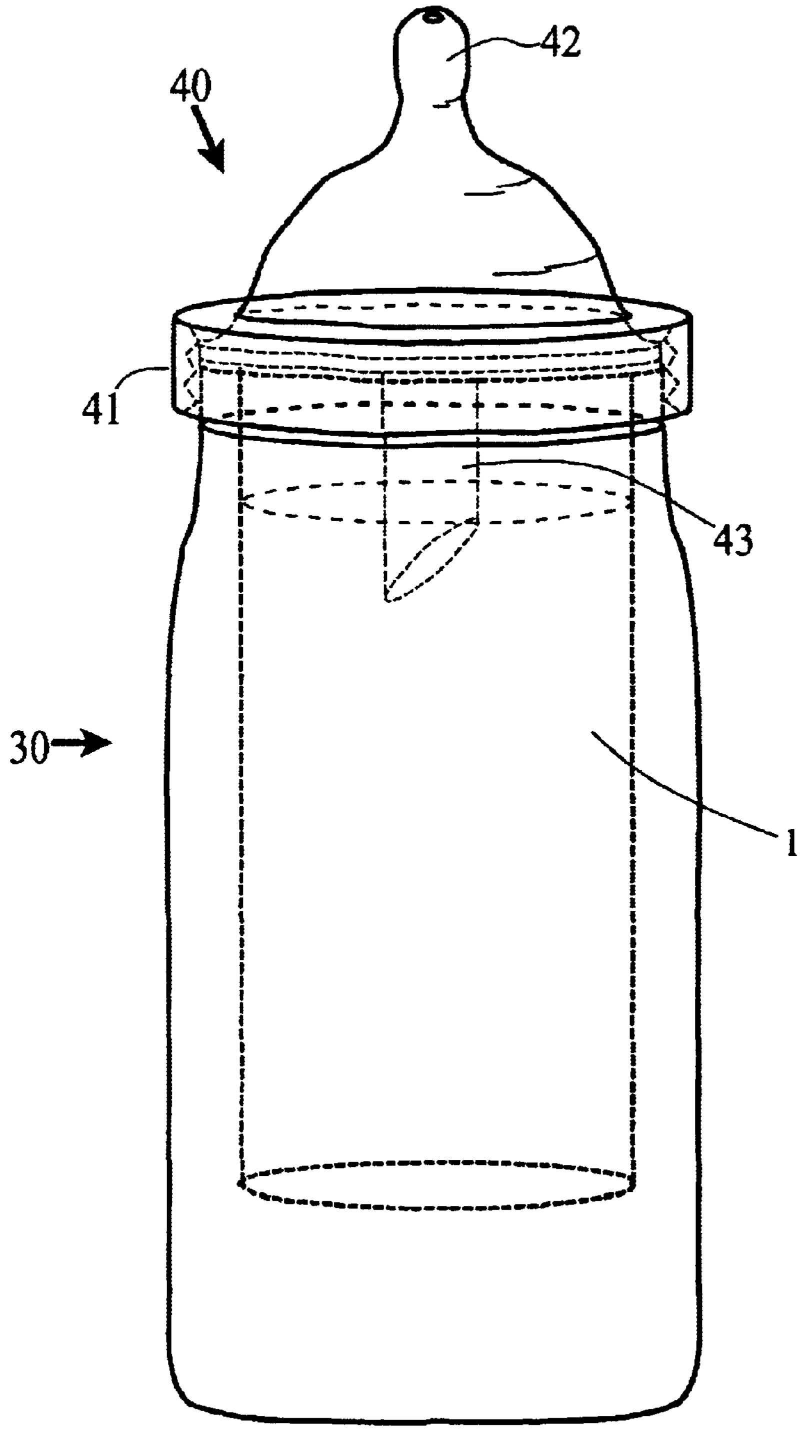
FIG. 7 shows an entire serving assembly with bottle, package, and dispensing assembly.

In FIG. 7, the entire assembly is shown ready for serving, with hidden features shown by dashed lines. The nipple-type dispensing assembly (40) is installed atop the holder (30) and engaged at the threaded portion of the holder and the threaded ring. The drop-in package (1) is captured securely in the assembly, held in place by the flange pinched between the lip of the holder (30) and the disk of puncturing conduit (43). The pointed conduit (61) has punctured the inner seal (the first ply film), providing a fluid flow path from the reservoir of the drop-in package (1) to the nipple of the dispensing assembly.

Figure 8:
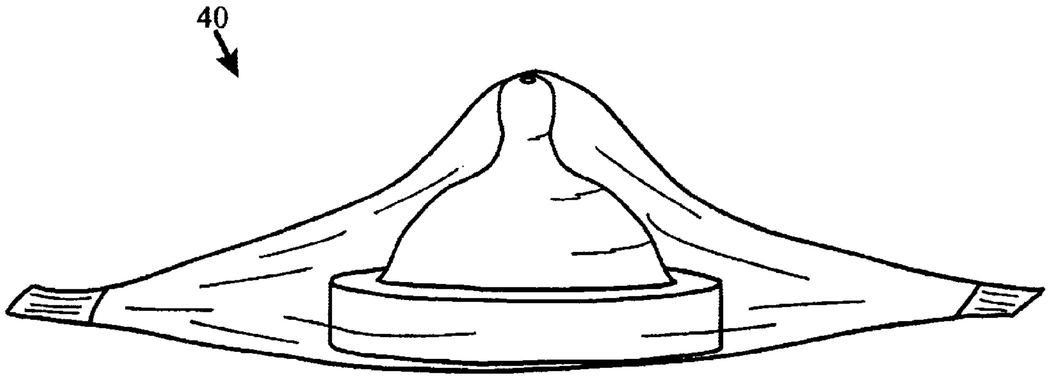
FIG. 8 shows a nipple assembly wrapped in a plastic or cellophane envelope for storage until ready to use.

In production, the container portion (2) of the drop-in package is preferably sterilized using one of many well-known methods, such as the use of hot air. Then, a fluid, such as human breast milk or nutritional supplement formula, is poured into the sterilized container portion. The first ply film is then applied and hermetically sealed to the top of the container portion along the flange. The second protective ply of the lid portion (7) is affixed to the drop-in package. A peel-away protective tab or label may be placed over the circular puncture port. The nipple and straw assemblies may be sterilized and packaged in a plastic or cellophane envelope, as shown in FIG. 8. This completes the product packaging, and may be followed by appropriate labeling or marking with information such as fluid type, nutritional analysis, production lot trace indicators, directions for use and storage, and an expiration date.

While the disclosure contained herein has set forth a preferred embodiment of the invention, and the fundamental mechanical components used within the invention are well known within the art, it will be appreciated by those who are skilled in the art that variations to the combination of elements, materials and steps disclosed can be made without departing from the scope and spirit of the invention.

What is claimed is:

1. A method for manufacture of a sealed, disposable container and associated puncturing device for use with a baby bottle, said baby bottle having a threaded nipple ring and nippple disposed in said nipple ring and a threaded baby bottle housing for threadedly receiving said nipple ring, said method comprising the steps of:

providing a sterilized cup portion having a generally cylindrical closed side wall, a closed bottom formed across said cylindrical closed side wall, and an open top, and also having an outwardly protruding flange formed circumferentially about the open top dimensioned and configured for association with the top of said baby bottle housing;

depositing within said sterilized cup portion a quantity of breastmilk;

applying a puncturable first ply across said flange of the cup portion such that a hermetically sealed chamber containing said breastmilk is formed with said closed side wall and closed bottom;

affixing a relatively unpuncturable second ply onto said puncturable first ply, said second ply having a circular puncturing portal formed therein for access to said first ply, and said second ply otherwise providing protective coverage for said first ply from accidental or unintentional breaking of the first ply: and associating a puncturing device with said cup and plies, said puncturing device comprising a round conduit with a top end and a bottom end, said bottom end of the conduit having a point for puncturing said first ply exposed through said puncturing portal, said puncturing device further comprising a circular disk disposed about said top end which is dimensioned and configured sufficiently to allow said puncturing device to be received by a friction fit into said baby bottle nipple ring, said cup portion being dimensioned and configured to received in and on said baby bottle housing, and said puncturing device being dimensioned and configured such that when said puncturing device is frictionally received in said baby bottle nipple ring and said sealed disposable container is associated with said bottle housing and said nipple ring is screwed down on said threads of said bottle housing, said pointed bottom end of said conduit engages and punctures said inner seal upon assembly of the baby bottle, the length of the conduit exceeding the diameter of the puncturing portal so that when said nipple ring is fully threaded onto said bottle housing, a circular flap of the first ply, formed by pressing the conduit through the puncturing portal, is prevented from being drawn back into the conduit by liquid flow, and wherein the length of the conduit is shorter than the depth of the threads on said baby bottle nipple ring such that the first ply is not punctured by the pointed end of the conduit until thread engagement between said nipple ring and said baby bottle has started.

2. A method for as set forth in claim 1, further comprising the step of providing a peel-away protective tab over said puncturing portal in said second ply to provide protection of said first ply from contaminants, said step of disposing the peel-away tab employing a means for disposition which is semi-permanent and suitable for separation by hand.

3. A method for manufacture as set forth in claim 1 wherein said step of applying a first ply over the cup portion comprises gluing a puncturable film to the flange.

4. A method for manufacture as set forth in claim 1 wherein said step of applying a first ply over the cup portion comprises heat bonding a plastic film to said flange.

* * * * *